United States Patent [19]

Von Ohain et al.

[11] 3,713,970
[45] Jan. 30, 1973

[54] CAVITY REACTOR WITH TWO STAGE SEPARATION

[75] Inventors: Hans J. P. Von Ohain, Dayton, Ohio; Melvin R. Keller, Pittsburgh, Pa.

[73] Assignee: The United States of America as represented by the Secretary of the United States Air Force

[22] Filed: Jan. 13, 1970

[21] Appl. No.: 2,598

[52] U.S. Cl. ..................... 176/45, 60/203, 176/39
[51] Int. Cl. ............................................. G21c 3/44
[58] Field of Search ............... 176/45, 39, 52; 60/203

[56] References Cited

UNITED STATES PATENTS

| | | | |
|---|---|---|---|
| 3,202,582 | 8/1965 | Rom | 176/39 X |
| 3,270,496 | 9/1966 | Rom | 176/39 X |
| 3,399,534 | 9/1968 | Hunter et al. | 60/203 |
| 3,546,069 | 12/1970 | McLafferty | 176/52 |

*Primary Examiner*—Carl D. Quarforth
*Assistant Examiner*—Harvey E. Behrend
*Attorney*—Harry A. Herbert, Jr. and Richard J. Killoren

[57] ABSTRACT

A colloidal gas core nuclear reactor having a high tensile strength outer semispheroidal pressure shell enclosing a moderator body member which surrounds a central cavity with an expanding nozzle at one end thereof. The greatest cavity radius is at the end remote from the nozzle. Hydrogen gas is supplied to the cavity to provide a vortex fow within the cavity. A conical duct is provided between the throat of the nozzle and the expansion portion of the nozzle. A groove and particle catcher is provided between the duct and expansion portion of the nozzle. The groove leads to a particle outlet duct.

2 Claims, 1 Drawing Figure

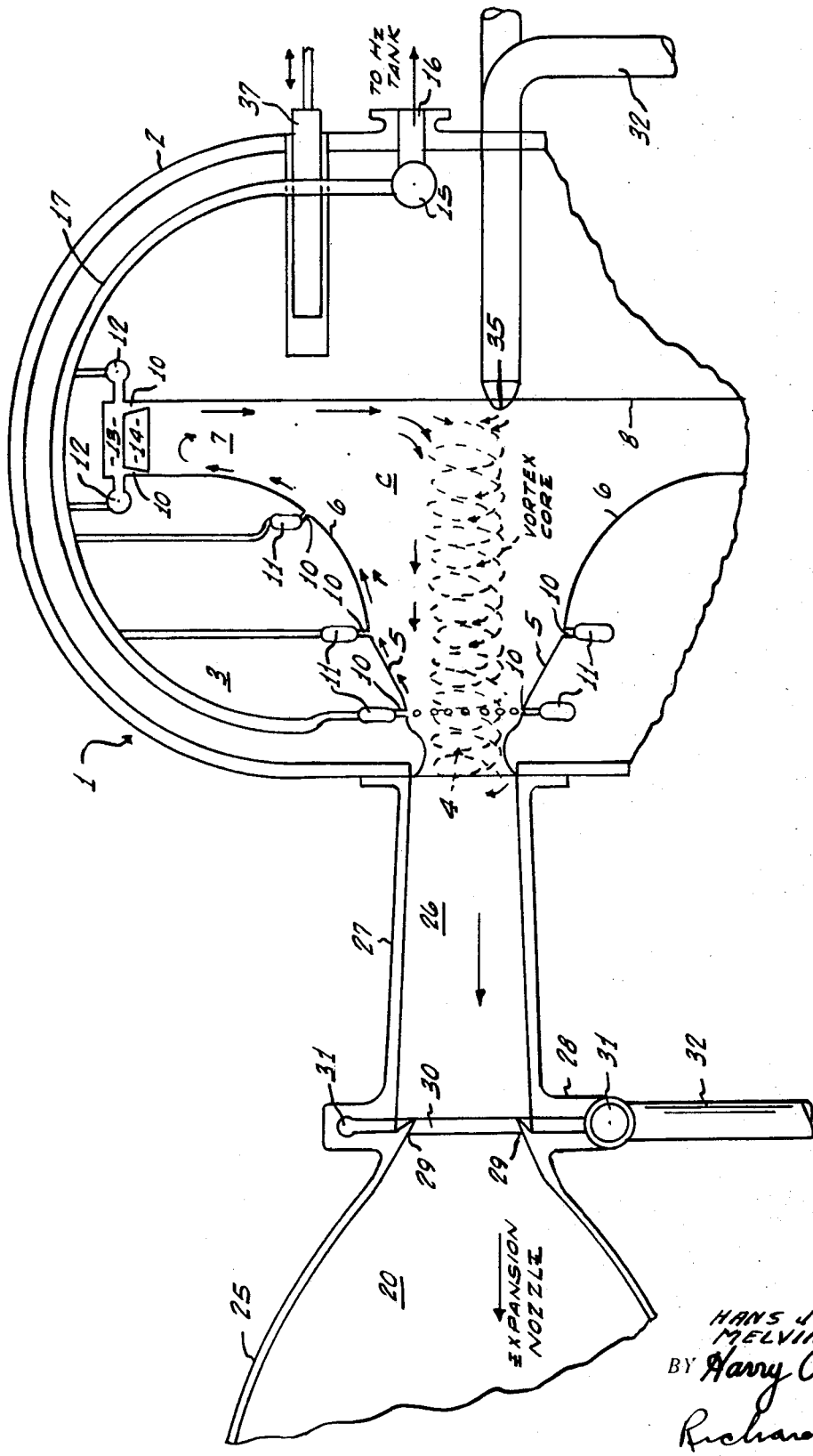

CAVITY REACTOR WITH TWO STAGE SEPARATION

In a copending invention disclosure entitled "Colloidal-Gas Core Reactor" Ser. No. 2597, filed Jan. 13, 1970 there is disclosed a nuclear dust core reactor of the type wherein the reactor cavity configuration and expellant gas injection means are such that during operation the atomic reactive material in the form of fine powder or the like is maintained out of contact with the reactor cavity walls.

In our invention above identified as well as in prior art devices a vortex flow is intentionally set up within the reactor cavity whereby a mixture of expellant gas (Hydrogen) and reacting nuclear material are separated, with the clean gas being discharged and the nuclear material being retained in the reactor cavity.

When the reactor cavity is operated at a high mass loading ratio of reactive material to expellant gas there is the possibility that nuclear material in the form of dust or metallic particles in the size order of under ten microns may escape in the stream of expellant gas. In order to conserve the supply of nuclear fuel, it is desirable to recapture such additional particles and return them to the reactor cavity.

The present invention relates to an improved dust core reactor system wherein particle separation is carried out in a two stage process. In accordance with the invention this is accomplished by interposing an external separator in the line of flow from the reactor cavity. In the second separator unit the residual rotation of the vortex core is relied upon to centrifuge the remaining reactive dust particles onto the chamber walls, the same being trapped and collected prior to expansion of the expellant gas in a rocket nozzle.

The invention will be clear by reference to the appended drawing taken in conjunction with the corresponding description.

The single FIGURE of the drawing, illustrates a schematic side elevation of the elements constituting the invention.

Referring now to the drawing, the reference numeral 1 generally indicates a dust core reactor of the type specifically disclosed by the present inventors in the above identified invention disclosure. The reactor 1 includes a semispherical pressure resisting shell 2 enclosing a moderator body 3 made of beryllium and while shown as a unitary body is preferably constructed of a number of individual parts assembled as a unitary whole. The pressure shell 2 and moderator body 3 are stationary and connected by conduits 15 and 16 to an external tank of expellant gas in the form of liquid hydrogen. The conduit 15 forms a part of a well known regenerative cooling system shown schematically at 17 whereby the liquid gas is passed seriatim through passages formed in the moderator body 3 and then injected into the reactor cavity. The reactor cavity generally indicated by the reference character "C" has a wall portion 4 forming the throat of the rocket nozzle. The wall then is formed with a conical portion 5 joining a radially outward extending portion 6 of convex shape which merges with an annular zone 7 with radial walls, one being the rear wall 8 of straight radial extent from the central horizontal axis. Circumferential rows of injection nozzles 10 are fed from annular passages 11. All of the annular passages 11 are connected to the regenerative cooling system supply of expellant gas under high pressure by suitable connections (not shown) in the moderator body 3. The nozzles 10 adjacent the throat 4 spill cool gas over the throat with a tangential whirl component as well as some of the discharge passing up the cavity wall 5.

At its radial outermost point the reactor cavity C in the portion 7 thereof is provided with an annular manifold 13 suitably connected by conduits 12 with the regenerative cooling system gas supply. Relatively cool gas is discharged from the manifold space 13 through passages (not shown) between vanes 14 which induces a strong tangential as well as radial component to the gas discharge. The underside of the vanes 14 are convex so that gaseous fluid contacting the vanes will flow off with an inwardly directed centrifugal force displacing any reactive material into the reactor cavity and preventing contact with the cavity walls in the region of high dust loading 7. The upper portions of the walls of the zone 7 are also washed by additional nozzles 10 positioned at each end of the vanes 14 and directing streams of hydrogen radially inward.

When a critical quantity of nuclear fuel in finely divided form is present in the reactor cavity C and expellant gas is admitted from high velocity jets with a tangential component from the various sets of nozzles 10 and swirl vanes 14, a strong vortex flow is set up in the reactor cavity C as indicated by the arrows. The radially inward flow along the rear wall 8 turns axially and joins the intensely spinning vortex core and flows axially toward the rocket nozzle throat 4. The intense centrifugal force fields set up in the reactor cavity C tends to centrifuge all particles radially outward with a maximum loading in the annular zone 7. The reacting particles intermix with the expellant gas and heat the same to very high temperatures. The particles returning in the downflow along wall 8 enter the intense centrifugal force field generated by the vortex core and are centrifuged outward prior to the clean gas passing into the throat section 4. There is, however, a possibility that, under high loading operating conditions, before all fine particles are centrifuged out of the vortex core they may pass the throat 4 of the rocket nozzle and be lost in the outgoing expellant gas stream. To obviate this, the nozzle throat 4 forms the entrance to an elongate conical duct passage 26 interposed between the nozzle throat 4 and the conventional exhaust nozzle 20 formed by the housing 25. The duct passage 26 is formed by a conical casing 27 abutting the throat 4 and positioned between the throat 4 and the expansion nozzle housing 25. Adjacent its downstream end the casing 27 is provided with an annular extension 28 having an internal radially extending annular groove 30. The groove 30 is formed at its outer end with a circumferential circular passage 31 of progressively increasing diameter to form a conventional scroll-type diffuser which is connected at its outlet to a return conduit or duct 32. The duct 32 which preferably is made with a suitable heat resistant inner liner (not shown) is connected at its return end to a nozzle 35 positioned adjacent the horizontal spin axis and adapted to discharge gas and entrained reactive particles tangentially into the reactor cavity C. An annular projection 29 adjacent the groove 30 acts as a catcher for the fine particles.

Operation of the device is as follows. With the dust core reactor 1 in operation, expellant gas at high temperature passes out of the reactor cavity C at the constricted throat section 4 thereof and moves downstream to the left as indicated by the arrows in FIG. 1. The expellant gas is moving with a subsonic axial velocity and is spinning due to vortex action at either subsonic or supersonic velocity. The flow is accentuated by the tangential coolant gas jets flowing over the throat section 4 from the nozzle set 11 adjacent thereto. The heated gas moving downstream through the duct passage 26 will have its axial velocity increased to supersonic. The vortex spin continuing into the duct passage 26 will centrifuge out any residual reactive particles passing through throat 4 and these particles will collect on and move along the duct passage 26 until they encounter catcher 29 and the radial groove 30 where they will be trapped and move outward into the scroll passage 31 along with some expellant gas. The pressure of the expellant gas in the diffuser scroll 31 is higher than the low subatmospheric pressure adjacent the injection nozzle 35 so that there is a continual flow induced from dust collecting groove 30 through scroll diffuser passage 31, return conduit 32 and nozzle 35 to insure return to the reactor cavity "C" of all reactive material separated in the duct passage 26.

Any conventional control means for externally moderated reactors may be provided, for example, such as a plurality of control rods 37, one of which is shown.

While a specific form of dust core reactor is herein disclosed, it will be understood that the invention is applicable to reactors having more conventional configuration and where the dust loading ratio is such that reactive material contacting the walls is not so serious a problem. For example, the reactor cavity may be generally cylindrical in form with expellant gas injection nozzles arranged around the complete circumference of the chamber walls to continually wash off and displace any nuclear material tending to collect there. The cavity may further employ other suitable expedients such as disclosed in our aforementioned disclosure.

We claim:

1. In combination with a vortex flow dust core nuclear reactor having an expellant gas and a critical mass of nuclear particles within a chamber; an expansion nozzle and means for providing a circumferential flow of hydrogen gas within the chamber to separate the nuclear particles from the expellant gas; an apparatus for removing nuclear particles from the expellant gas comprising a second particle separation unit; said nozzle being spaced from said chamber by means of the second separation unit; said second particle separation unit including a conical casing connected at one end to the output of said chamber and at the other end to the input of said expansion nozzle; said nozzle and said second separation unit being coaxial with said chamber; and means adjacent the interior surface of said expansion nozzle for removing nuclear particles from the conical casing which have been centrifuged out of said expellant gas.

2. The device as recited in claim 1 wherein said means for removing nuclear particles from said casing includes an internal annular groove in said conical casing adjacent said expansion nozzle; an annular means connected to said expansion nozzle and projecting into said conical casing, between said groove and said expansion nozzle for catching nuclear particles and a circular outlet passage of increasing radius connected to said groove.

* * * * *